(12) United States Patent
Zhang et al.

(10) Patent No.: US 12,011,741 B2
(45) Date of Patent: Jun. 18, 2024

(54) AUTOMATIC IDENTIFICATION AND CLASSIFICATION PRODUCTION LINE FOR MOBILE TERMINAL LCD SCREENS

(71) Applicant: HEFEI UNIVERSITY OF TECHNOLOGY, Hefei (CN)

(72) Inventors: Lei Zhang, Hefei (CN); Ziqi Li, Hefei (CN); Yu Zheng, Hefei (CN); Yuanfeng Wu, Hefei (CN)

(73) Assignee: HEFEI UNIVERSITY OF TECHNOLOGY, Hefei (CN)

( * ) Notice: Subject to any disclaimer, the term of this patent is extended or adjusted under 35 U.S.C. 154(b) by 416 days.

(21) Appl. No.: 17/420,398

(22) PCT Filed: Jan. 12, 2021

(86) PCT No.: PCT/CN2021/071299
§ 371 (c)(1),
(2) Date: Jul. 2, 2021

(87) PCT Pub. No.: WO2021/244034
PCT Pub. Date: Dec. 9, 2021

(65) Prior Publication Data
US 2022/0226864 A1    Jul. 21, 2022

(30) Foreign Application Priority Data
Jun. 4, 2020 (CN) .......................... 202010499745.2

(51) Int. Cl.
*B07C 5/12* (2006.01)
*B07C 5/04* (2006.01)
(Continued)

(52) U.S. Cl.
CPC ................. *B07C 5/12* (2013.01); *B07C 5/04* (2013.01); *B07C 5/36* (2013.01); *B07C 5/38* (2013.01);
(Continued)

(58) Field of Classification Search
CPC .... B07C 5/04; B07C 5/12; B07C 5/36; B07C 5/38; B65G 49/06; B65G 49/061; B65G 49/064; B65G 49/067
See application file for complete search history.

(56) References Cited

U.S. PATENT DOCUMENTS 4,845,917 A * 7/1989 Omura .................. G07D 11/50
53/53

FOREIGN PATENT DOCUMENTS

CN    205701488 U  * 11/2016
CN    111632865 A  *  9/2020  ............... B07C 5/04
(Continued)

*Primary Examiner* — Terrell H Matthews (57) ABSTRACT

An automatic identification and classification production line for mobile terminal liquid crystal display (LCD) screens includes a size and posture identification adjustment part, a model identification part, and a classification storage device. The size and posture identification adjustment part can transport a mobile terminal LCD screen, identify front and back surfaces of the mobile terminal LCD screen, size of the mobile terminal LCD screen, and orientation of the mobile terminal LCD screen, and adjust the front surface of the mobile terminal LCD screen to face up and the orientation of the mobile terminal LCD screen to be the same as the transportation direction during transportation. The model identification part transports the mobile terminal LCD screen after adjustment of the posture, and identifies model of the mobile terminal LCD screen according to the size during transportation. The classification storage device classifies and stores mobile terminal LCD screens according to different models.

9 Claims, 10 Drawing Sheets

(51) Int. Cl.
  *B07C 5/36*  (2006.01)
  *B07C 5/38*  (2006.01)
  *B65G 49/06*  (2006.01)

(52) U.S. Cl.
  CPC ........... *B65G 49/06* (2013.01); *B65G 49/061* (2013.01); *B65G 49/064* (2013.01); *B65G 49/067* (2013.01); *B65G 2249/04* (2013.01)

(56) References Cited

FOREIGN PATENT DOCUMENTS

| | | | | | |
|---|---|---|---|---|---|
| CN | 112087744 | A | * | 12/2020 | ............. H04L 67/02 |
| CN | 113111696 | A | * | 7/2021 | |
| DE | 3821106 | A1 | * | 6/1988 | |

\* cited by examiner

AUTOMATIC IDENTIFICATION AND CLASSIFICATION PRODUCTION LINE FOR MOBILE TERMINAL LCD SCREENS

CROSS REFERENCE TO THE RELATED APPLICATIONS

This application is the national phase entry of International Application No. PCT/CN2021/071299, filed on Jan. 12, 2021, which is based upon and claims priority to Chinese Patent Application No. 202010499745.2, filed on Jun. 4, 2020, the entire contents of which are incorporated herein by reference.

TECHNICAL FIELD

The present invention relates to an automatic identification and classification production line for mobile terminal liquid crystal display (LCD) screens, and relates to a recycling technology for mobile terminal display screens.

BACKGROUND

With rapid development of mobile Internet technology and widespread popularity of smart phones, the market storage of mobile terminals has increased year by year, and the amount of scrapped mobile terminal products has also increased with years. Compared with traditional waste electronic and electrical products, waste mobile terminals have the characteristics of high residual value and long remaining life; however, the recycling of waste mobile terminals has the problems of difficulty evaluating quality of the product to be recycled, leakage of personal privacy information, sophisticated dismantling, and the excessive dependence on labor and so on, and there is currently a lack of effective solutions.

LCD screens are an important part of waste mobile terminals recycle, and centralized classification which is performed after disassembling the LCD screen of the waste mobile terminal is an important step in the recycling process. The current centralized classification of waste LCD screens of mobile terminals is mainly done manually, and has the following disadvantages.

There are many types of mobile terminal LCD screens to be tested, and for different sizes of mobile terminal LCD screens to be tested, it is often necessary to set up multiple recycling production lines to identify and classify the LCD screens, which increases recycling costs and limits production layout and production resource allocation;

The identification and classification of waste LCD screens of mobile terminals are mainly done manually. A tester observes an LCD screen by means of microscopic equipment and judge the model of the LCD screen. As the number of types of LCD screens to be identified and the workload increase, the accuracy rate of manual identification is difficult to be guaranteed.

SUMMARY

In view of the above technical problems, the present invention provides an automatic identification and classification production line for mobile terminal LCD screens. In order to provide an assembly line that can automatically identify and classify mobile terminal LCD screens of various sizes and models, after an identification program is set in the computer through the use of neural networks and machine learning technology, the assembly line can automatically identify and classify the mobile terminal LCD screens to be detected.

In order to achieve the above objective, the present invention provides the following technical solutions. An automatic identification and classification production line for mobile terminal LCD screens, including a size and posture identification adjustment part, a model identification part, and a classification storage device; wherein:

the size and posture identification adjustment part can transport a mobile terminal LCD screen, identify a front surface and a back surface of the mobile terminal LCD screen, a size of the mobile terminal LCD screen, and an orientation of the mobile terminal LCD screen, adjust the front surface of the mobile terminal LCD screen to face up and adjust the orientation of the mobile terminal LCD screen to be a same as a transportation direction during transportation;

the model identification part is used for the mobile terminal LCD screen after transportation posture adjustment, and identifies a model of the mobile terminal LCD screen according to the size during a transportation; and the classification storage device classifies and stores the mobile terminal LCD screens according to different models.

Further, the size and posture identification adjustment part includes:

two loading conveyors arranged sequentially in a front-rear direction and each provided with a guide partition plate, a distance between rear sections of the guide partition plates being greater than a length of the short side of the mobile terminal LCD screen and less than a length of the long side of the mobile terminal LCD screen, the two loading conveyors being each provided with a detection camera thereon, the detection camera on the first loading conveyor being used to capture image information of the mobile terminal LCD screen to assist identification of the size and front and back surfaces of the mobile terminal LCD screen, the detection camera on the second loading conveyor being used to capture image information of the mobile terminal LCD screen to assist identification of the orientation of the mobile terminal LCD screen;

a turning device arranged between the two loading conveyor;

two grabbing and moving devices arranged respectively at discharge ends of the two loading conveyors, wherein a first grabbing and moving device grabs and transports the mobile terminal LCD screen to the second loading conveyor, and transports the mobile terminal LCD screen into the turning device, when the back surface of the mobile terminal LCD screen faces up, wherein the mobile terminal LCD screen passes through the turning device and enters the second loading conveyor, and a second grabbing and moving device can transport the mobile terminal LCD screen to the model identification part, and when the orientation of the LCD mobile terminal is opposite to the transportation direction, an output shaft of a sucker motor of the second grabbing and moving device rotates 180°.

Further, the model identification part includes a positioning device, an image acquisition device, and a computer identification device, wherein the positioning device is configured to push the mobile terminal LCD screen to a detection area, the image acquisition device is configured to compare a characteristic area of the mobile terminal LCD screen and transmitting the acquired image information to the computer identification device, and the computer identification device includes a setting program, wherein the setting program identifies a specific model of the mobile terminal LCD screen.

Further, the positioning device includes positioning cylinders, a positioning spring, station sensors, a bottom end positioning block, a left end positioning block, a vertical positioning block, a right end positioning block, a screw motor, a discharge slide, a light source, and a positioning slide, the positioning slide being provided with an opening on a top end thereof in a vicinity of a left side wall, two positioning cylinders being provided on a right side and a bottom end of the positioning slide slot, respectively, the bottom end positioning block being slidably mounted at a bottom end in the positioning slide, the right end positioning block being arranged in the positioning slide slot, the bottom end positioning block and the right end positioning block being located respectively on a piston rod of a positioning cylinder at the bottom end of the positioning slide and on a piston rod of the positioning cylinder on the right side of the positioning slide slot by means of positioning springs, the left end positioning block being provided in the opening and connected to the screw motor to achieve lifting, two station sensors being provided to detect positions of the bottom end positioning block and the right end positioning block, respectively, the discharge slide being connected to the opening of the positioning slide, and the vertical positioning block being arranged above the positioning slide and, after descending, presses on a top surface of the mobile terminal LCD screen.

Further, the image acquisition device includes a guide rail-slider mechanism with three degrees of freedom and an industrial camera; and the industrial camera is fixedly mounted on the guide rail-slider mechanism with the three degrees of freedom.

Further, the classification storage device includes a base, a rotating shaft, and a storage tank, wherein the storage tank is rotatably mounted on the base by the rotating shaft and the storage tank is located directly below an outlet of the discharge slide.

Further, the loading conveyor includes a conveying table, the detection camera, a detection bracket, and the guide partition plates, wherein the guide partition plate has a lower half portion provided in an inferior arc shape, the two guide partition plates are symmetrically arranged on the conveying table, a gap between the two guide partition plates includes a trumpet-shaped portion composed of two arc-shaped portions and a rectangular portion, wherein the rectangular portion has a width greater than the length of the short side of the mobile terminal LCD screen and less than the length of the long side of the mobile terminal LCD screen, the detection bracket is arranged in a middle of a top surface of the conveying table, and the detection camera is arranged directly above the rectangular portion.

Further, the turning device includes a turning bracket, a rotating shaft, a three-jaw frame, and a barrier, the three-jaw frame is provided with three long arms and the three-jaw frame rotatably mounted on the turning frame by the rotating shaft with the three long arms arranged equidistantly around the rotating shaft, the long arm being each provided on front and back surfaces thereof with a feeding slot and a discharge slot between which the barrier is mounted.

Further, the grasping and moving device includes a sucker, a coupling, a sucker motor, a sucker cylinder, a pneumatic solenoid valve, a vacuum generator, a conduit, a guide rail, and a sliding table, wherein the sucker and the sucker motor are connected via the coupling, the other end of the sucker motor is fixed at a piston rod end of the sucker cylinder, the sucker cylinder, the pneumatic solenoid valve, and the vacuum generator are mounted on the sliding table, wherein the sliding table is mounted on the guide rail, and the sucker is connected to the vacuum generator through the conduit.

Further, the sucker includes a suction head, a sucker spring, and an affluxion tube, wherein the suction head is connected to the sucker spring to realize flexible contact between the suction head and the mobile terminal LCD screen; four suction heads are evenly distributed, the affluxion tube being connected to the four suckers, and one passage of the affluxion tube is connected to the vacuum generator through the conduit.

Compared with the prior art, the present invention has advantageous effects as follows:

The present invention can automatically identify and classify mobile terminal LCD screens of various models and sizes, has fully automated identification process and high identification accuracy. The problem that manual identification cannot guarantee accuracy and has low identification efficiency is avoided, production efficiency is greatly improved, and the cost of identification is reduced.

In the drawings:
- 1 Loading conveyor; 2 Grabbing and moving device; 3 Turning device; 4 Positioning device; 5 classification storage device; 6 image acquisition device; 7 Computer identification device; 8 Mobile terminal LCD screen;
- 11 Conveying table; 12 Detection camera; 13 Detection bracket; 14 Guide partition plate;

21 Sucker; 22 Coupling; 23 Sucker motor; 24 Sucker cylinder; 25 Pneumatic solenoid valve; 26 Vacuum generator; 27 Guide rail; 28 Sliding table; 29 Conduit; 211 Suction head; 212 Sucker spring; 213 Affluxion tube;

31 Turning bracket; 32 Rotating shaft; 33 Feeding slot; 34 Barrier; 35 Discharge slot;

41 Positioning cylinder; 42 Positioning spring; 43 Station sensor; 44 Bottom end positioning block; 45 Turning channel; 46 Left end positioning block; 47 Vertical positioning block; 48 Right end positioning block; 49 Screw rod motor; 410 Discharge slide; 411 Light source; 412 Positioning slide;

51 Base; 52 Rotating shaft; 53, Storage tank;

61 Guide rail-slider mechanism with three degrees of freedom; 62 Industrial camera;

81 Back surface of mobile terminal LCD screen; 82 Front surface of mobile terminal LCD screen; 83 Characteristic area.

DETAILED DESCRIPTION OF THE EMBODIMENTS

The technical solutions in the embodiments of the present invention will be clearly and completely described below in reference with the accompanying drawings according to the embodiments of the present invention. Obviously, the described embodiments are only a part of the embodiments of the present invention, rather than all the embodiments. Based on the embodiments of the present invention, all other embodiments achieved by those of ordinary skill in the art without creative work shall fall within the protection scope of the present invention.

In the description of the present invention, it should be noted that the orientation or positional relationship indicated by the terms "upper", "lower", "inner", "outer", "front end", "rear end", "two ends", "one end", "the other end", or the like is based on the orientation or positional relationship shown in the drawings and is only a simplified description for the convenience of describing the present invention, but it does not indicate or imply that the device or element referred to must have a specific orientation or be configured and operated in a specific orientation. Hence, it cannot be understood as a limitation of the present invention. In addition, the terms "first" and "second" are only used for descriptive purposes and cannot be understood as indicating or implying relative importance.

In the description of the present invention, it should be noted that, unless otherwise clearly specified and defined, the terms "mounted", "provided with", "connected", or the like should be understood in a broad sense, and for example, "connected" may refer to fixed connection, detachable connection, or integral connection; may also refer to mechanical connection or electrical connection; may also refer to direct connection, indirect connection via an intermediate medium, or internal communication between two components. For those of ordinary skill in the art, the specific meanings of the above-mentioned terms in the present invention can be understood according to specific situations.

An automatic identification and classification production line for mobile terminal LCD screens includes a size and posture identification adjustment part, a model identification part, and a classification storage device; in which:

the size and posture identification adjustment part can transport a mobile terminal LCD screen, identify front and back surfaces of the mobile terminal LCD screen, size of the mobile terminal LCD screen, and orientation of the mobile terminal LCD screen, and adjust the front surface of the mobile terminal LCD screen to face up and the orientation of the mobile terminal LCD screen to be the same as the transportation direction during transportation;

the model identification part is used for transporting the mobile terminal LCD screen after adjustment of the posture, and identifies model of the mobile terminal LCD screen according to the size during transportation; and the classification storage device classifies and stores mobile terminal LCD screens according to different models.

Figure 1:
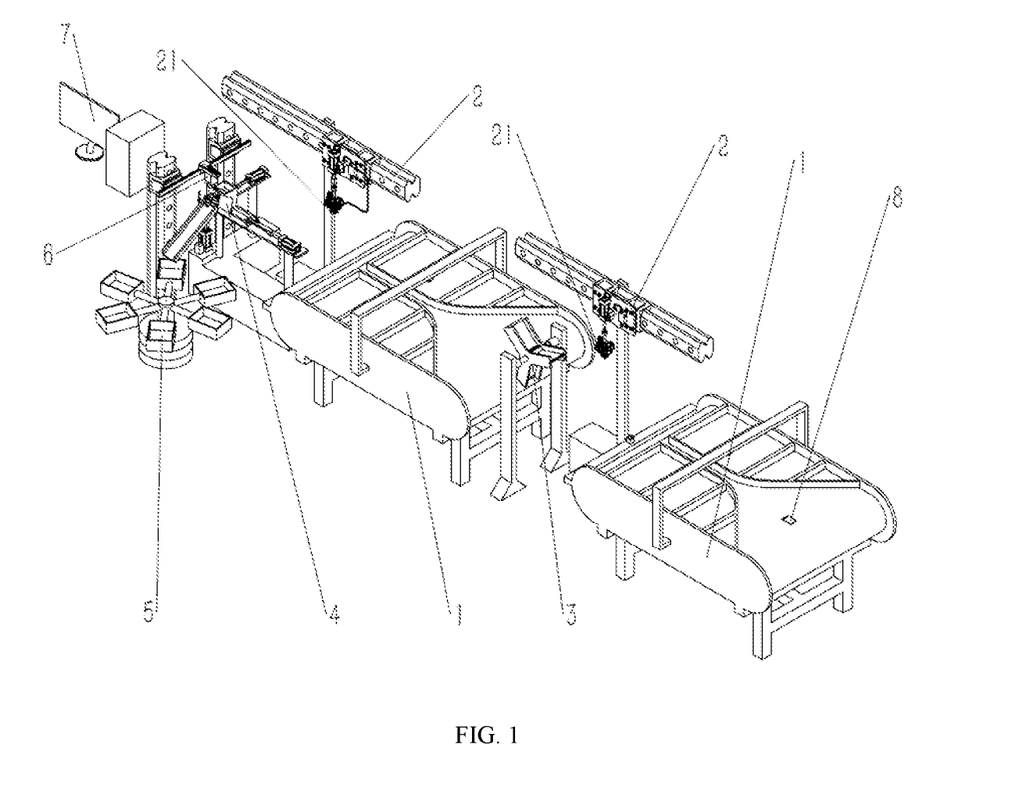
FIG. 1 is a schematic diagram of a three-dimensional structure of an automatic identification and classification production line for mobile terminal LCD screens according to an embodiment of the present invention.

Referring to FIG. 1, an automatic identification and classification production line for mobile terminal LCD screens includes a loading conveyor 1, a grabbing and moving device 2, a turning device 3, a positioning device 4, a classification storage device 5, an image acquisition device 6, a computer identification device 7, and a mobile terminal LCD screen 8.

Specifically, the numbers of the loading conveyor 1 and the grabbing and moving device 2 are both two, and their control is independent of each other and does not interfere with each other.

Specifically, the turning device 3 is provided on an outlet side of the first loading conveyor 1, the other side of the turning device 3 is adjacent to an inlet side of the second loading conveyor 1, an inlet side of the positioning device 4 is adjacent to an outlet side of the second loading conveyor 1, the image acquisition device 6 is provided on a positioning end side of the positioning device 4, the classification storage device 5 is provided on an outlet side of the positioning device 4, and two grabbing and moving devices 2 are arranged on the same side of the production line. The mobile terminal LCD screen 8 to be detected enters the production line from the inlet side of the first loading conveyor 1.

The working principle is as follows. After the mobile terminal LCD screen 8 to be detected enters the inlet of the first loading conveyor 1, a detection camera 12 mounted at the upper end of the loading conveyor 1 detects the mobile terminal LCD screen 8 to check whether it faces up and to determine the size of the LCD screen;

after the preliminary detection is completed, the mobile terminal LCD screen 8 is moved to an outlet of the loading conveyor 1, and a sucker 21 of the gripping and moving device 2 moves and closes directly above the mobile terminal LCD screen 8, and grabs the mobile terminal LCD screen 8 through use of air pressure difference generated by a vacuum generator 26;

if the front surface of the LCD screen is facing up, the sucker 21 grabs the LCD screen and places it in an inlet of the second loading conveyor 1; if the back surface of the LCD screen is facing up, the sucker 21 grabs the LCD screen and places it in a feeding slot 33 of the turning device 3, and after the LCD screen is turned over by the turning device 3, the sucker 21 grabs the LCD screen and places it in an inlet of the second loading conveyor 1;

the mobile terminal LCD screen 8 is moved to an outlet of the second loading conveyor 1, the sucker 2 grabs the LCD screen, and a detection camera 12 mounted on the lower side of the outlet of the loading conveyor 1 detects the LCD screen again to check whether the front end of the LCD screen is oriented to the same direction as the moving direction of the conveyor belt; if not, an output shaft of a sucker motor 23 on the grabbing and moving device 2 rotates 180 degrees to drive the sucker 21 and the mobile terminal LCD screen 8 to rotate 180 degrees, thereby ensuring the front end of the LCD screen faces to be oriented to the same direction as the moving direction of the conveyor belt;

the sucker 21 grabs the mobile terminal LCD screen 8 and moves it above an inlet of the positioning device 4, then the air pressure inside of the sucker 21 returns to normal, and the mobile terminal LCD screen 8 falls on the inlet of the positioning device 4; a bottom end positioning block 44 of the positioning device 4 is driven by a piston rod of a positioning cylinder 41 to push the mobile terminal LCD screen 8 to the detection area, and the bottom end positioning block 44, a left end positioning block 46, a vertical positioning block 47, and a right end positioning block 48 of the positioning device 4 perform complete positioning operation for the LCD screen;

after the LCD screen is completely positioned, the image acquisition device 6 collects image of a characteristic area 73 of the mobile terminal LCD screen 8 and transmits the collected image information to the computer identification device 7, and a setting program in the computer identification device 7 identifies the specific model of the LCD screen;

after the model identification of the mobile terminal LCD screen 8 is completed, according to the model of the LCD screen, a storage tank 53 corresponding to the model in the classification storage device 5 is rotated to the lower end of a discharge slide 410, and the mobile terminal LCD screen 8 slides down through the discharge slide 410 and falls into the corresponding storage tank 53.

The identification and classification are completed.

Figure 2:
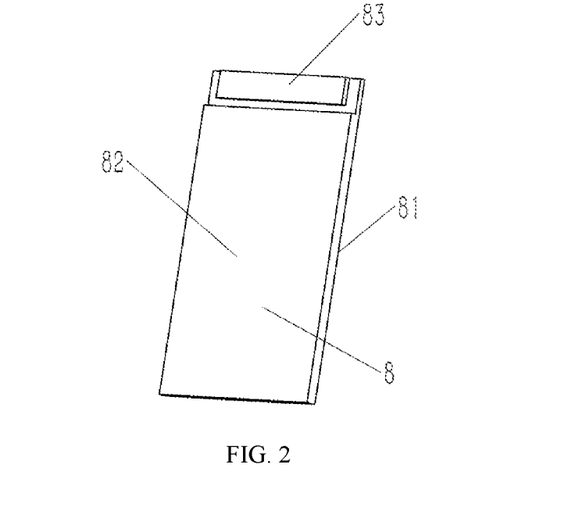
FIG. 2 is a schematic structural diagram of a mobile terminal LCD screen according to an embodiment of the present invention.

Specifically, referring to FIG. 2, the mobile terminal LCD screen 8 has a front surface 82 and a back surface 81. The characteristic area 83 is located at the front end of the front surface 82. Since the characteristic areas of different models of LCD screens are different, it is necessary to adjust the front surface 82 of the mobile terminal LCD screen to face up and the rear end of the LCD screen to contact the bottom end positioning block 44 when the image of the characteristic area 83 of the LCD screen is collected by the positioning device 4.

Figure 3:
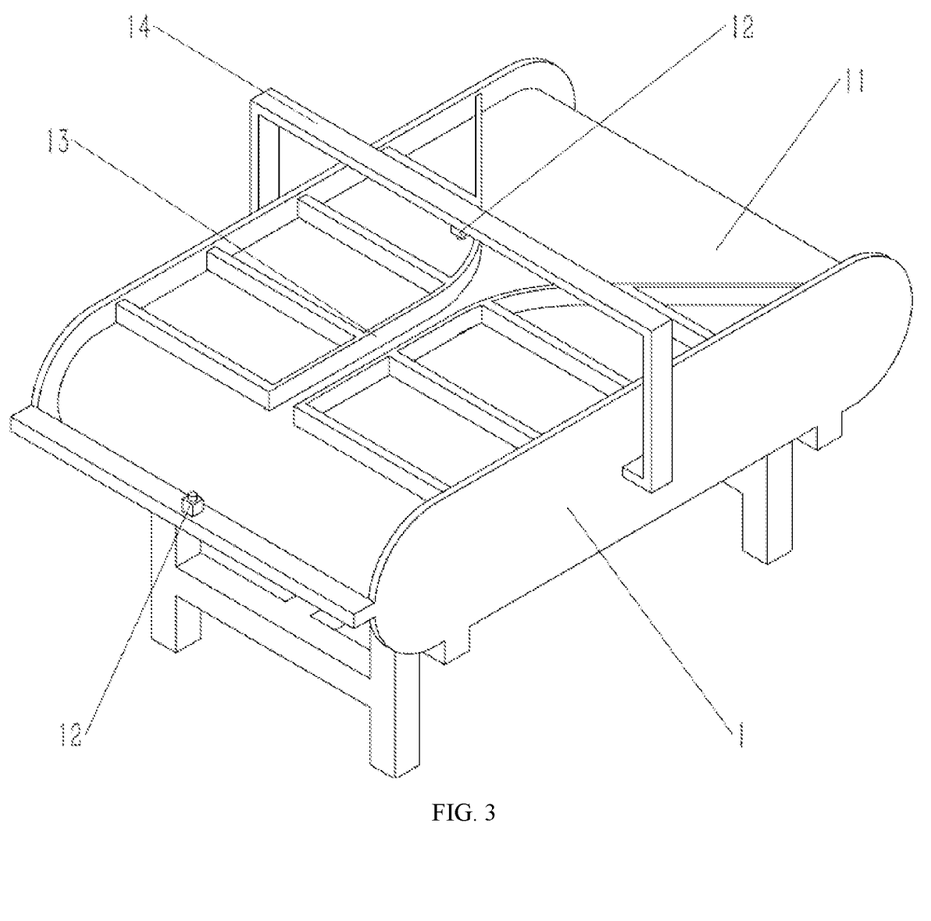
FIG. 3 is a schematic structural diagram of a loading conveyor according to an embodiment of the present invention.

Specifically, referring to FIG. 3, guide partition plates 14 are fixedly mounted at an upper end of a conveying table 11 of the loading conveyor 1, and the distance between the guide partition plates 14 is slightly greater than the length of the short side of the LCD screen, thereby guiding the LCD screen to forward along a straight line on the conveying table 11 in the way that the front end of the LCD screen placed forward or backward.

Further, two detection cameras 12 mounted at the upper end of the conveying table 11 and the lower side of the outlet are respectively used to detect the size of the LCD screen, whether the front surface faces up, and whether the front end is oriented in the same direction as the moving direction of the conveying belt. The detection cameras 12 are in communication with a computer program, and thereby the detection and determination are performed by means of image identification technology.

Figure 4:
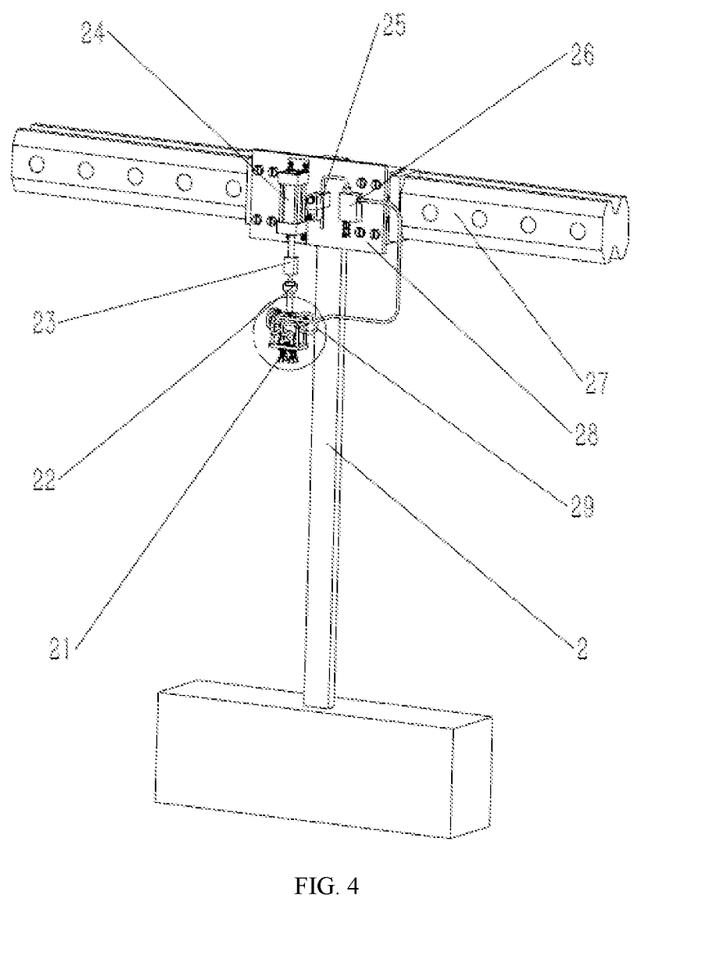
FIG. 4 is a schematic structural diagram of a grabbing and moving device according to an embodiment of the present invention.
Figure 5:
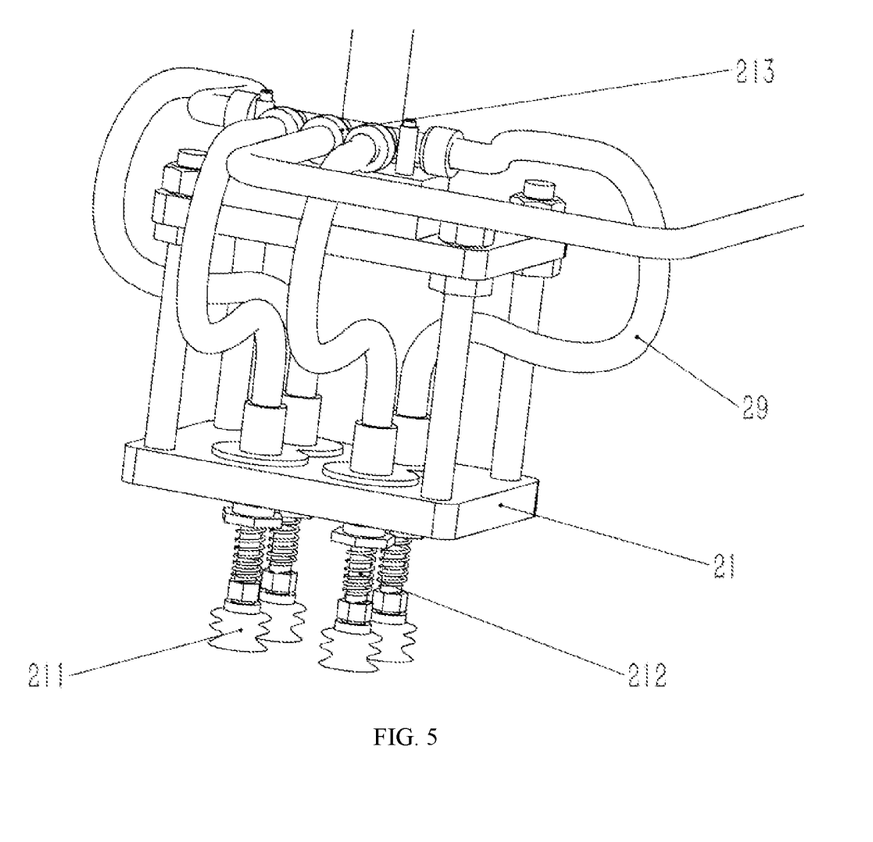
FIG. 5 is a schematic structural diagram of a sucker of the grabbing and moving device according to an embodiment of the present invention.

Specifically, referring to FIGS. 4 and 5, the grabbing and moving device 2 includes the sucker 21, a coupling 22, the sucker motor 23, a sucker cylinder 24, a pneumatic solenoid valve 25, the vacuum generator 26, a guide rail 27, a sliding table 28, and conduits 29. The sucker 21 is connected to the output shaft of the sucker motor 23 via the coupling 22, and the sucker motor 23 is connected to the sucker cylinder 24; the action of the sucker cylinder 24 can realize the movement of the sucker 21 in the vertical direction, and the sucker motor 23 can drive the sucker 21 to rotate around a vertical axis. The sucker cylinder 24, the pneumatic solenoid valve 25, and the vacuum generator 26 are all mounted and fixed on the sliding table 28, and the sliding table 28 can move linearly along the horizontal direction on the guide rail 27. Consequently, the sucker 21 has three degrees of freedom of movement.

Further, the sucker 21 is equipped with four suction heads 211 which communicate with the affluxion tube 213 through the conduits 29, and the affluxion tube 213 communicates with the vacuum generator 26 through the conduits 29; the sucker 21 can suck and grasp the LCD screen due to the inner cavity vacuum produced by the vacuum generator 26 under controlling the pneumatic solenoid valve 25. In addition, the sucker 21 is equipped with a sucker spring 212, thus achieving flexible contact between the sucker 21 and the surface of the LCD screen, thereby the LCD screen is prevented from being crushed by the sucker 21. It should be noted that the assembling method of the sucker 21 given in this embodiment is only to facilitate the explanation of the solution of this embodiment, but is not a limitation of the specific structure of the sucker 21 in the present invention.

Figure 6:
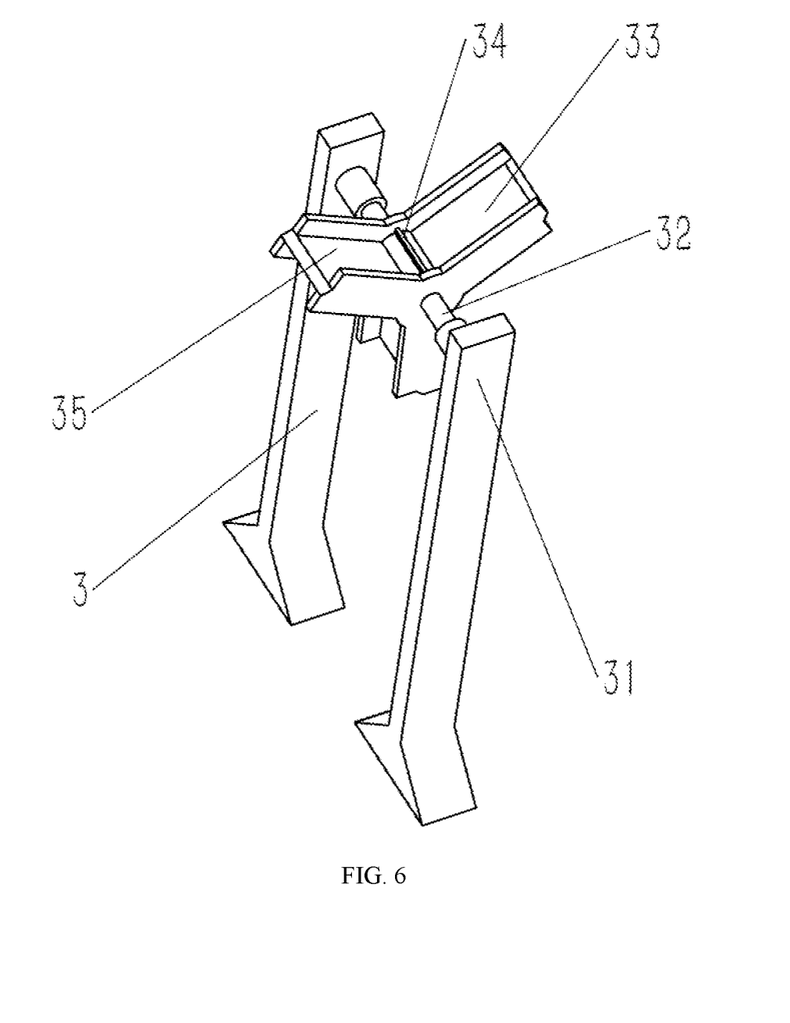
FIG. 6 is a schematic structural diagram of a turning device according to an embodiment of the present invention.

Specifically, referring to FIG. 6, the turning device includes a turning bracket 31, a rotating shaft 32, a feeding slot 33, a barrier 34, and a discharge slot 35. The feeding slot 33, the barrier 34, and the discharge slot 35 are integrated to form a three-jaw frame, which is connected to the rotating shaft 32, and can rotate around a shaft of the turning bracket 31. When the sucker 21 grabs the mobile terminal LCD screen 8 to feed it, the feeding slot 33 is horizontal. After the LCD screen is placed in the feeding slot 33, the rotating shaft 32 rotates 120 degrees; during the rotation, the LCD screen starts to slide down in the feeding slot 33 due to gravity, the LCD screen turns over after the lower end thereof touches the barrier 34, then falls into the feeding slot 35, continues to slide in the feeding slot 35, slides down from the turning device 3, and finally falls to the inlet side of the second loading conveyor 1.

Figure 7:
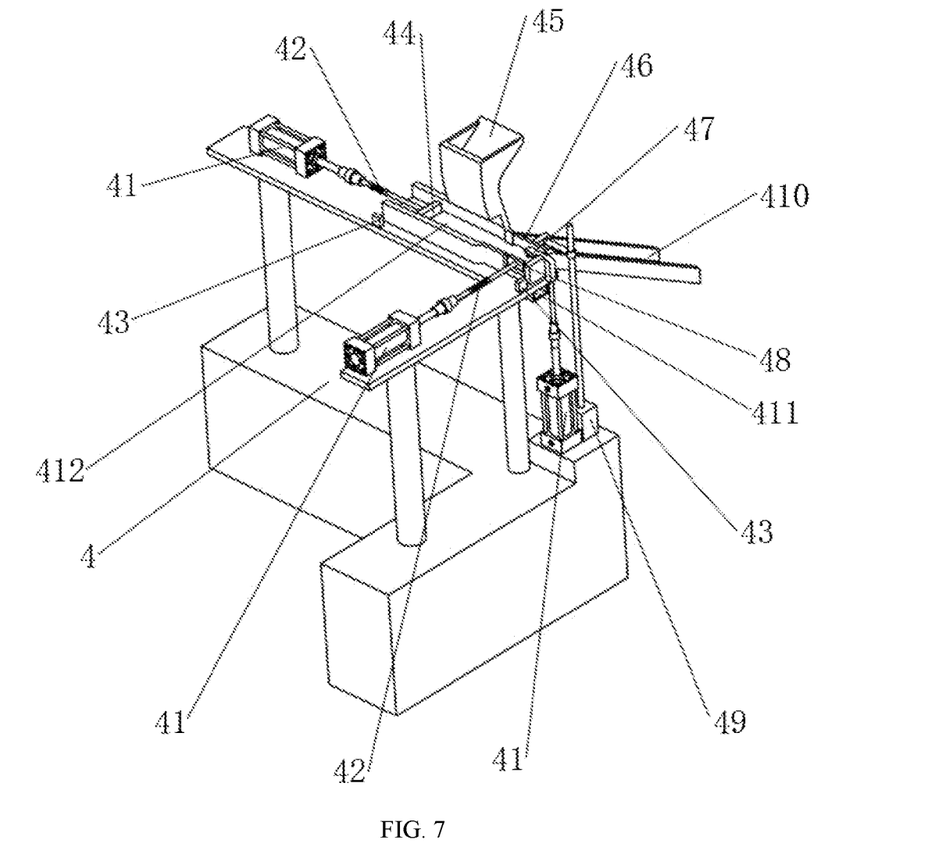
FIG. 7 is a schematic diagram of a three-dimensional structure of a positioning device according to an embodiment of the present invention.
Figure 8:
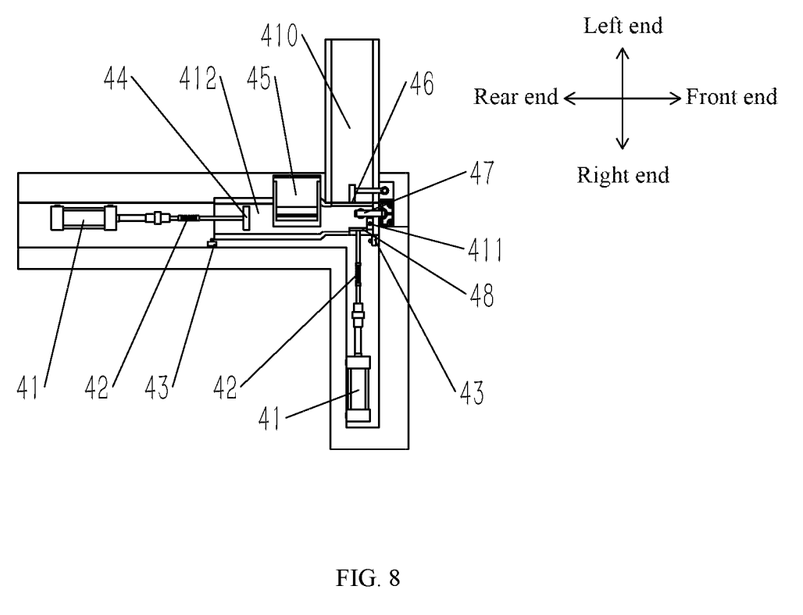
FIG. 8 is a top view of the positioning device according to an embodiment of the present invention.
Figure 9:
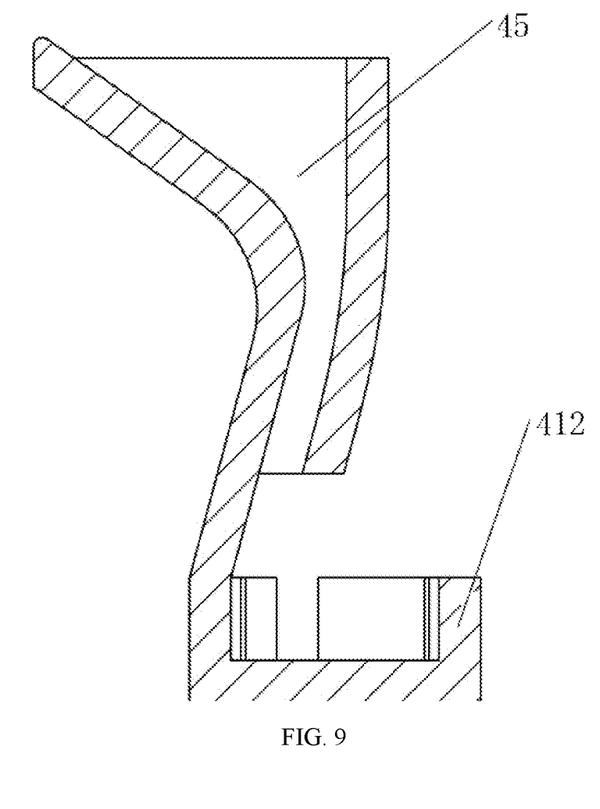
FIG. 9 is a cross-sectional view of a turning channel of the positioning device according to an embodiment of the present invention.
Figure 10:
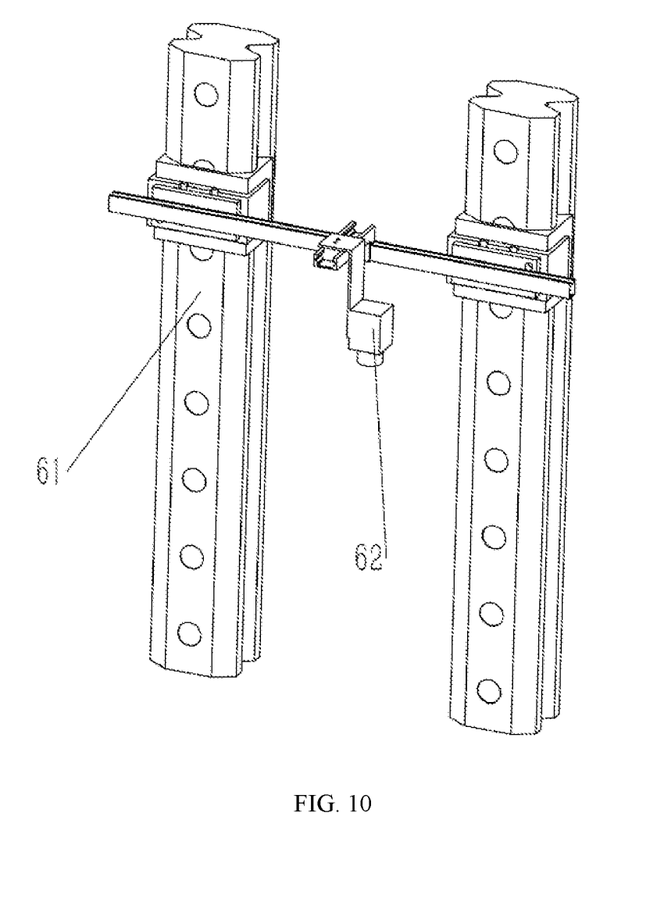
FIG. 10 is a schematic structural diagram of an image acquisition device according to an embodiment of the present invention.

Specifically, referring to FIGS. 7, 8, and 9, the positioning device 4 includes a positioning cylinder 41, a positioning spring 42, a station sensor 43, a bottom end positioning block 44, a turning channel 45, a left end positioning block 46, and a vertical positioning block 47, a right end positioning block 48, a screw motor 49, a discharge slide 410, a light source 411, and a positioning slide 412. The bottom end positioning block 44, the left end positioning block 46, and the right end positioning block 48 are individually connected at one section thereof to a positioning spring 42. The other end of the positioning spring 42 is connected to the piston rod of the positioning cylinder 41. When the positioning block clamps the LCD screen, flexible contact therebetween is achieved, thereby avoiding the LCD screen from being excessively squeezed and damaged. The left end positioning block 46 is connected with the screw motor 49, and the screw motor 49 controls the left end positioning block 46 to move linearly in the vertical direction. In the initial state, the left end positioning block 46 flushes horizontally with the positioning slide 412 to completely fill the gap of an outlet of the positioning slide 412.

Further, the sucker 21 grabs and places the LCD screen on the inlet side of the positioning slide 412 of the positioning device 4, and the bottom end positioning block 44 pushes the LCD screen to advance in the positioning slide 412 under the action of the positioning cylinder 41; the station sensor 43 is mounted on the side in the forward direction, when the station sensor 43 detects that the bottom end positioning block 44 moves to a first station, the front end of the LCD screen has not yet contacted the top end of the positioning slide 412, and the right end positioning block 48 starts to move under the action of the positioning cylinder 41 and clamps the LCD screen in corporation with the left end positioning block 46 that is temporarily fixed; when the station sensor 43 arranged on the side of the right end positioning block 48 in the movement direction detects that the right end positioning block 48 moves to the station where the LCD screen is clamped, the bottom end positioning block 44 continues to move to push the LCD screen to the second station of which a front end contacts the top end of the positioning slide 412, until the front and rear ends of the LCD screen are clamped; at this time, the vertical positioning block 47 starts to move downward until the front surface 82 and the back surface 81 of the LCD screen are in close contact with the vertical positioning block 47 and the positioning slide 412; and the surface of the vertical positioning block 47 contacting the LCD screen is made of a flexible material, such as rubber and sponge, to avoid crushing the surface of the LCD screen. So far, the complete positioning of the LCD screen is achieved.

Further, if it is determined that the type of the mobile terminal LCD screens 8 to be detected is only a small size LCD screen, the LCD screen can be turned over through the turning channel 45 of the positioning device 4, without need of the turning device 3. As shown in FIG. 9, which is a cross-sectional view of the turning channel 45, the sucker 21 grabs the LCD screen with the back surface facing up to directly above the turning channel 45 and then releases the LCD screen. The LCD screen turns over and falls along the slide in the turning channel 45, falls on the positioning slide 412 with the front surface facing up, and then positioning of the LCD screen can be continued.

Figure 11:
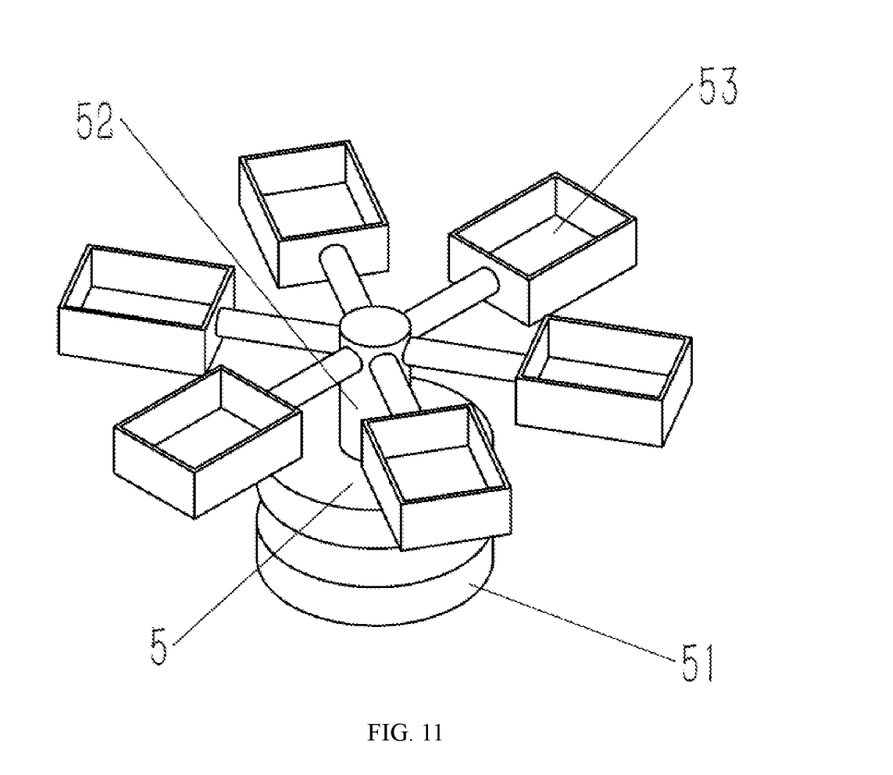
FIG. 11 is a schematic structural diagram of a classification storage device according to an embodiment of the present invention.

Specifically, referring to FIG. 11, the image acquisition device 6 includes a guide rail-slider mechanism 61 with three degrees of freedom and an industrial camera 62; the industrial camera 62 is fixedly mounted on the guide rail-slider mechanism 61 with three degrees of freedom, and the industrial camera 62 can be moved to a suitable position for image acquisition.

Further, for LCD screens of different sizes, the position of their characteristic area 83 is different. For each size of the mobile terminal LCD screen 8, the collection position of the industrial camera 62 needs to be determined in advance. After the mobile terminal LCD screen 8 is positioned on the positioning device 4, the industrial camera 62 moves to different positions according to the predetermined three-dimensional coordinates to acquire image information of the characteristic area 83.

Specifically, the image information acquired is transmitted to the computer identification device 7. A model identification program for LCD screens is written based on neural network and machine learning technology and packaged in the computer identification device 7. After receiving the image information acquired by the image acquisition device 6, the computer identification device 7 makes a judgment on the model of LCD screen in a very short time.

Specifically, referring to FIG. 11, according to the model judgment result from the computer identification device 7, a storage tank 53 for storing the corresponding model of LCD screen in the classification storage device 5 rotates to a position under the discharge slide 410; the left end positioning block 46 moves vertically upward under the action of the screw motor 49 to open the gap at the discharge end of the positioning slide 412, then the right end positioning block 48 pushes the LCD screen onto the discharge slide 410, and the LCD screen falls into the storage tank 53 along the discharge slide 410. So far, the identification and classification of the mobile terminal LCD screen 8 are finished. It is obvious to those skilled in the art that the present invention is not limited to the details of the exemplary embodiments described above, and the present invention can be realized in other specific implementation without departing from the spirit or basic characteristics of the present invention. Therefore, from any point of view, the embodiments should be regarded as exemplary and non-limiting. The scope of the present invention is defined by the appended claims rather than the foregoing description, and therefore all changes that fall within the meaning and scope of equivalent elements in the claims are intended to be encompassed in the present invention. Any reference signs in the claims should not be regarded as limiting the claims mentioned.

What is claimed is:

1. An automatic identification and classification production line for mobile terminal liquid crystal display (LCD) screens, comprising a size and posture identification adjustment part, a model identification part, and a classification storage device, wherein, the size and posture identification adjustment part is configured to transport a mobile terminal LCD screen, identify a front surface and a back surface of the mobile terminal LCD screen, a size of the mobile terminal LCD screen, and an orientation of the mobile terminal LCD screen, adjust the front surface of the mobile terminal LCD screen to face up and adjust the orientation of the mobile terminal LCD screen to be a same as a transportation direction during transportation;

the model identification part is used for transporting the mobile terminal LCD screen after an adjustment of a posture, and identifies a model of the mobile terminal LCD screen according to the size during a transportation;

the classification storage device classifies and stores the mobile terminal LCD screens according to different models;

the size and posture identification adjustment part comprises: two loading conveyors, a turning device, and two grabbing and moving devices;

wherein the two loading conveyors are arranged sequentially in a front-rear direction, and guide partition plates are provided on the two loading conveyors, respectively;

a distance between rear sections of the guide partition plates is greater than a length of a short side of the mobile terminal LCD screen and less than a length of a long side of the mobile terminal LCD screen;

detection cameras are provided above the two loading conveyors, respectively, wherein a first detection camera of the detection cameras is located on a first loading conveyor of the two loading conveyors and is used to capture first image information of the mobile terminal LCD screen to assist identification of the size, the front surface and the back surface of the mobile terminal LCD screen; and a second detection camera of the detection cameras is located on a second loading conveyor of the two loading conveyors and is used to capture second image information of the mobile terminal LCD screen to assist identification of the orientation of the mobile terminal LCD screen;

the turning device is arranged between the two loading conveyors;

the two grabbing and moving devices are arranged respectively at discharge ends of the two loading conveyors, wherein a first grabbing and moving device of the two grabbing and moving devices grabs and transports the mobile terminal LCD screen to the second loading conveyor, and transports the mobile terminal LCD screen into the turning device when the back surface of the mobile terminal LCD screen faces up, wherein the mobile terminal LCD screen passes through the turning device and enters the second loading conveyor; and a second grabbing and moving device of the two grabbing and moving devices transports the mobile terminal LCD screen to the model identification part, and when the orientation of the LCD mobile terminal is opposite to the transportation direction, an output shaft of a sucker motor of the second grabbing and moving device rotates 180°.

2. The automatic identification and classification production line for the mobile terminal LCD screens according to claim 1, wherein the model identification part comprises a positioning device, an image acquisition device, and a computer identification device;

wherein the positioning device is configured to push the mobile terminal LCD screen to a detection area;

the image acquisition device is configured to capture image on a characteristic area of the mobile terminal LCD screen and transmit acquired image information to the computer identification device; and the computer identification device comprises a setting program, wherein the setting program identifies a specific model of the mobile terminal LCD screen.

3. The automatic identification and classification production line for the mobile terminal LCD screens according to claim 2, wherein the positioning device comprises positioning cylinders, a positioning spring, station sensors, a bottom end positioning block, a left end positioning block, a vertical positioning block, a right end positioning block, a screw motor, a discharge slide, a light source, and a positioning slide;

wherein an opening is provided on a top end of the positioning slide in a vicinity of a left side wall;

two positioning cylinders are provided on a right side and a bottom end of a positioning slide slot, respectively;

the bottom end positioning block is slidably mounted at a bottom end in the positioning slide;

the right end positioning block is arranged in the positioning slide slot;

the bottom end positioning block and the right end positioning block are located respectively on a first piston rod of a first positioning cylinder of the two positioning cylinders and on a second piston rod of a second positioning cylinder of the two positioning cylinders positioning springs, wherein the first positioning cylinder is located at the bottom end of the positioning slide slot, and the second positioning cylinder is located on the right side of the positioning slide slot;

the left end positioning block is provided in the opening and connected to the screw motor to achieve lifting;

two station sensors are provided to detect positions of the bottom end positioning block and the right end positioning block, respectively;

the discharge slide is connected to the opening of the positioning slide; and the vertical positioning block is arranged above the positioning slide and, after descending, presses on a top surface of the mobile terminal LCD screen.

4. The automatic identification and classification production line for the mobile terminal LCD screens according to claim 3, wherein the image acquisition device comprises a guide rail-slider mechanism with three degrees of freedom and an industrial camera; and the industrial camera is fixedly mounted on the rail-slider mechanism with the three degrees of freedom.

5. The automatic identification and classification production line for the mobile terminal LCD screens according to claim 3, wherein the classification storage device comprises a base, a rotating shaft, and a storage tank, wherein the storage tank is rotatably mounted on the base by the rotating shaft, and the storage tank is located directly below an outlet of the discharge slide.

6. The automatic identification and classification production line for the mobile terminal LCD screens according to claim 1, wherein a loading conveyor of the two loading conveyors comprises a conveying table, a detection camera of the detection cameras, a detection bracket, and a guide partition plate of the guide partition plates;

wherein the guide partition plate has a lower half portion provided in an inferior arc shape;

the two guide partition plates are symmetrically arranged on the conveying table;

a gap between the two guide partition plates comprises a trumpet-shaped portion composed of two arc-shaped portions and a rectangular portion, wherein the rectangular portion has a width greater than the length of the short side of the mobile terminal LCD screen and less than the length of the long side of the mobile terminal LCD screen;

the detection bracket is arranged in a middle of a top surface of the conveying table; and the detection camera is arranged directly above the rectangular portion.

7. The automatic identification and classification production line for the mobile terminal LCD screens according to claim 1, wherein the turning device comprises a turning bracket, a rotating shaft, a three-jaw frame, and a barrier;

wherein the three-jaw frame is provided with three long arms, and the three-jaw frame is rotatably mounted on the turning frame by the rotating shaft;

the three long arms are arranged equidistantly around the rotating shaft;

a feeding slot and a discharge slot is provided on front and back surfaces of each long arm, respectively; and the barrier is mounted between the feeding slot and the discharge slot.

8. The automatic identification and classification production line for the mobile terminal LCD screens according to claim 1, wherein the grasping and moving device comprises a sucker, a coupling, a sucker motor, a sucker cylinder, a pneumatic solenoid valve, a vacuum generator, a conduit, a guide rail, and a sliding table;

wherein the sucker and a first end of the sucker motor are connected via the coupling;

a second end of the sucker motor is fixed at a piston rod end of the sucker cylinder;

the sucker cylinder, the pneumatic solenoid valve, and the vacuum generator are mounted on the sliding table, wherein the sliding table is mounted on the guide rail; and the sucker is connected to the vacuum generator through the conduit.

9. The automatic identification and classification production line for the mobile terminal LCD screens according to claim 8, wherein the sucker comprises a suction head, a sucker spring, and an affluxion tube;

wherein the suction head is connected to the sucker spring to realize flexible contact between the suction head and the mobile terminal LCD screen;

four suction heads are evenly distributed;

the affluxion tube is connected to the four suckers; and one passage of the affluxion tube is connected to the vacuum generator through the conduit.

\* \* \* \* \*